United States Patent Office 3,810,921
Patented May 14, 1974

3,810,921
CATALYTIC PROCESS FOR THE OXIDATION OF ORTHOXYLENE TO PHTHALIC ANHYDRIDE
James Michael Maselli, Ellicott City, and Gwan Kim, Columbia, Md., assignors to W. R. Grace & Co., New York, N.Y.
No Drawing. Filed June 17, 1970, Ser. No. 47,136
Int. Cl. C07c 63/02
U.S. Cl. 260—346.4
5 Claims

ABSTRACT OF THE DISCLOSURE

Oxidation of orthoxylene to phthalic anhydride with a catalyst composed of vanadium oxide, potassium pyrosulfate, and antimony oxide on a titania carrier promoted with promotional amounts of chromia. The catalyst can be used either in fluid or fixed bed systems.

BACKGROUND OF THE INVENTION

The invention relates to the production of phthalic anhydride. More specifically, it relates to production of phthalic anhydride by the air oxidation of orthoxylene in the presence of a vanadium oxide, potassium pyrosulfate, antimony oxide catalyst on a titania carrier. The catalyst is promoted with promotional amounts of chromia.

It is known that phthalic anhydride can be prepared by the oxidation of orthoxylene with gases that contain oxygen (especially air), in the presence of catalysts. These catalysts can be in a fixed bed or fluidized form. Catalysts consisting of vanadium pentoxide and potassium pyrosulfate on a titanium dioxide or silica gel support have been disclosed previously. However, these catalysts have given economically unsuitable yields of phthalic anhydride due to the production of large amounts of undesirable carbon oxides and the use of uneconomical reaction conditions for large plant size operations.

Broadly, the invention contemplates the production of phthalic anhydride by the oxidation of orthoxylene in the presence of a catalyst comprising vanadium oxide, an alkali pyrosulfate, and antimony oxide supported on a titanium dioxide carrier. Chromia is added to the catalyst in promotional amounts, i.e. from 0.10 to 0.75 weight percent.

The catalyst according to this invention is a vanadium type catalyst, i.e. vanadium oxide, e.g. vanadium pentoxide, partially reduced vanadium pentoxide, etc.

In the preparation of the catalyst, the vanadium oxide may be added in the form of vanadium pentoxide, ammonium vanadate, vanadium trichloride, vanadium trioxide, vanadium tetroxide, vanadyl sulfate and the like.

The alkali pyrosulfate may be added in the form of potassium pyrosulfate, potassium hydrogen sulfate, potassium sulfate plus sulfuric acid and the like.

The antimony oxide is added as antimony trioxide or as a soluble salt that is converted to antimony trioxide in the process of preparation.

In the preferred process, the titanium dioxide and antimony trioxide are blended together as a first step of the catalyst preparation. The chromium promoter is added as a solution of a salt such as the sulfate, for example. This addition is conveniently made by adding the solution of chromium salt to the solution of vanadium and potassium salts used to impregnate the dry mix of the titania base with antimony trioxides. Examples of suitable chromium salts include chromium sulfate, chromium acetate, etc.

The titanium dioxide, which can be used in the practice of this invention, is obtained by precipitation of titanium dioxide, subsequent drying, and calcining. When the catalyst is to be used in the fluid bed system, the particles are reduced to a particle size of −80 to 325 mesh. If the catalyst is to be prepared for a fixed bed system, the particles have a grain size of 2 to 10 millimeters and advantageously 4 to 7 millimeters. The surface area can be about 5 to 200 square meters per gram. The carrier may also be used in the form of microspheres which may be obtained by spray drying aqueous suspensions.

The catalyst composition has the following range of components:

(a) Titanium dioxide support between 30 and 93 percent by weight and preferably 67 to 88 percent by weight;
(b) Vanadium oxide between 1 to 10 percent by weight, and preferably 1 to 4 percent by weight expressed as vanadium pentoxide ($V_2O_5$);
(c) Alkali pyrosulfate between 5 and 50 percent by weight and preferably 10 to 25 percent by weight;
(d) Antimony trioxide between 1 to 10 percent by weight, preferably 1 to 4 percent by weight; and
(e) Chromium is present in promotional amounts less than 1 percent, usually 0.1 to 0.75 percent, preferably 0.25 to 0.5 percent expressed as $Cr_2O_3$.

The catalysts of this invention are suitable for use in both fluid bed and fixed bed reactors and the particle size is therefore dependent on the use intended.

There are a number of ways in which the catalysts of this invention can be prepared. Specifically, a good catalyst which exhibits long life, excellent selectivity and good conversion have been prepared by one of the following methods:

(a) Dry mixing a proper sized titania with a finely ground antimony trioxide and then impregnating the dry mixed solids with aqueous solutions containing vanadyl sulfate, potassium pyrosulfate, and chromium sulfate in the desired proportions, drying the impregnated mix at 110° C. and then heating the catalyst in air at 500° C. for 5 hours;

(b) Impregnating proper sized titania with a slurry consisting of vanadyl sulfate, chromium sulfate, and potassium pyrosulfate dissolved in water into which the fine sized antimony trioxide is suspended, drying the mix at 110° C. and heating the catalyst for 5 hours at 500° C. All the catalytic components are in the proper ratio to provide for long life and high activity.

The processing conditions for using this catalyst, in either the fluid or fixed bed systems are essentially similar. They do differ in the residence or contact time of the orthoxylene feed over the catalytic bed. Reaction temperatures for both fluid and fixed bed processes are in the range of 250 to 420° C., preferably 330° to 390° C.

In either the fluid or fixed bed systems, orthoxylene feed is mixed with a molecular oxygen containing gas such as air. The preferred molar ratio of oxygen to orthoxylene is 3 to 20 moles of oxygen per mole of orthoxylene.

Flow velocities of the gases and vapors should be controlled so that residence periods in the fluid bed systems are from about 1.5 to 7 seconds, preferably about 1.5 to 3 seconds, and in the fixed bed system are from 0.1 to 2 seconds, preferably about 0.1 to 1.8 seconds. The residence time is customarily defined, as the average time during which the starting material is in contact with the catalyst.

Residence time
$$= \frac{\text{Void volume of catalyst bed at reaction temperature and pressure}}{\text{Volumetric feed rate of gaseous reactants at reaction temperature and pressure}}$$

The process, fluid or fixed bed, using our novel catalyst gives most desirable results when the reaction is carried out under pressures of about 1 to 2 atmospheres. Slightly increased pressures up to 3 atmospheres and as high as 10 atmospheres may be used, however.

When using the catalyst of this invention in a fluidized bed system, it is kept in fluidized motion in a tube or iron or alloy steel. Distribution of the gas is carried out at the lower end of the reaction tube, which may or may not be conically restricted through a plate of ceramic or metal sintered material or through an annular gap produced by a conical insert.

When using smaller reaction tubes, extraction of heat may take place through the walls of the reaction tube, for example, by air cooling or by means of a salt melt, while in larger systems, the installation of cooling coils in the fluidized bed is necessary to extract the reaction heat. The heat may be utilized for steam production.

It is advantageous to carry out the reaction of this invention in the presence of sulfur dioxide and therefore to add to the catalyst chambers small amounts of sulfur trioxide or sulfur dioxide or sulfur compounds which are oxidized to sulfur dioxide and sulfur trioxide under reaction conditions. The sulfur compound is added at a rate of 0.04 mole to 0.4 mole of $SO_2$ per mole of orthoxylene.

The selectivity of the process, i.e. the ratio of moles of phthalic anhydride produced to moles of orthoxylene reacted in mole percent, is lower with increased temperature. On the other hand, the conversion of orthoxylate falls with decreasing temperature. Selectivity and conversion depend on the use of our novel catalyst, especially when the reaction is carried out at the pressures set out above.

Our invention is further illustrated by the following specific but non-limiting examples. In these examples, all parts are by weight unless otherwise stated, and all mesh sizes are U.S. standard.

EXAMPLE 1

Titanium dioxide previously sized to −100 to +325 mesh was dry blended with antimony trioxide to a uniform distribution in a rotary mixer. This dry mixture was impregnated with an aqueous solution of the sulfate salts of vanadium, chromium, and potassium This impregnation was carried out by heating the solution of the components and spraying the hot solution into the rotating bed of the antimony trioxide-titania, the liquid volume being just sufficient to saturate the solid phase. The sulfate concentration in the final catalyst more specifically the $K_2O$ to $SO_3$ ratio depends to some extent on the sulfate concentration in the aqueous phase.

The damp impregnated mixture was then dried at 110° C. The air-dried catalyst was then calcined at 500° C. for 5 hours to complete the preparation of the catalyst.

The resulting catalyst contained the following components expressed in weight percent:

| | |
|---|---|
| V as $V_2O_5$ | 2.9 |
| Sb as $Sb_2O_3$ | 4.0 |
| K as $K_2O$ | 6.8 |
| S as $SO_3$ | 12.0 |
| Cr as $Cr_2O_3$ | 0.4 |

The catalyst had a surface area of 7 square meters per gram and an average particle size of 50 microns. This catalyst was designated Catalyst A.

Another catalyst was prepared using the same technique as described above except that no chromia was added. The catalyst contained the following components in weight percent:

| | |
|---|---|
| V as $V_2O_5$ | 2.8 |
| Sb as $Sb_2O_3$ | 3.9 |
| K as $K_2O$ | 6.2 |
| S as $SO_3$ | 9.8 |
| Cr and $Cr_2O_3$ | None |

The catalyst had a surface area of 6 square meters per gram and a particle size of 50 microns. This catalyst was designated Catalyst B.

EXAMPLE 2

The catalysts were evaluated by adding one pound of the catalyst to an electrically heated steel vertical reaction tube which had a diameter of 1 inch and a length of 6 feet. The pressure in the reaction zone was held constant at 20 p.s.i.g. throughout the test. The temperature, air to feed ratio and catalyst loading (contact time) were varied in order to optimize phthalic anhydride yields from each of the catalysts. Sulfur dioxide was fed along with the preheated air-orthoxylene mixture at a rate of 1 to 2 weight percent of the orthoxylene feed rate.

The data collected in these runs is set out in the table below:

TABLE I

| Catalyst | Weight ratio-air to orthoxylene | T. in °C. | Catalyst loading* | Conversion in mole percent | Selectivity in mole percent | Phthalic anhydride yield in wt. percent |
|---|---|---|---|---|---|---|
| A | 10 | 360 | 0.055 | 98.5 | 76.0 | 105 |
| B | 11 | 365 | 0.076 | 95 | 72 | 95.5 |

*Catalyst Loading equals pounds of orthoxylene fed per hour per pound of catalyst in the reactor.

It is apparent from these data that the mole percent conversion, the mole percent selectivity, and the phthalic anhydride yield are improved substantially when the vanadia-antimony trioxide-potassiumm pyrosulfate catalyst on a titania base is promoted with as little as 0.4 weight percent chromia.

What is claimed is:

1. A process for the catalytic vapor phase oxidation of orthoxylene to phthalic anhydride which comprises passing a mixture of orthoxylene and a molecular oxygen containing gas having a ratio of 3 to 20 moles of oxygen per mole of orthoxylene over a finely divided catalyst in a fluidized form at a temperature of 250° to 420° C., said catalyst consisting of a mixture of about 1 to 10 weight percent vanadium oxide, 5 to 50 percent by weight potassium pyrosulfate, and 1 to 10 percent by weight antimony trioxide promoted with 0.1 to 0.75 weight percent chromium oxide on a 30 to 93 percent by weight titania support.

2. The process according to claim 1 wherein the mixture of molecular oxygen containing gas and orthoxylene further contains from about 0.04 mole to 0.40 mole of sulfur dioxide per mole of orthoxylene.

3. A process for the catalytic vapor phase oxidation of orthoxylene to phthalic anhydride which comprises passing a mixture of orthoxylene and a molecular oxygen containing gas having a molar ratio of 3 to 20 moles of oxygen per mole of orthoxylene over a granular catalyst in a fixed bed, at a temperature of 250 to 420° C., said catalyst comprising a mixture of about 1 to 10 weight percent vanadium oxide, 5 to 50 weight percent potassium pyrosulfate, and 1 to 10 weight percent antimony trioxide promoted with 0.1 to 0.75 weight percent chromia on 30 to 93 percent by weight of a titania base.

4. The process according to claim 3 wherein said mixture of molecular oxygen containing gas and orthoxylene further contains about 0.04 to 0.4 mole of sulfur dioxide per mole of orthoxylene.

5. The process according to claim 4 wherein the reaction is carried out in a fixed bed system over a catalyst of pellets about 4 mm. by 4 mm.

References Cited

UNITED STATES PATENTS 3,480,565 11/1969 Adams _____ 260—346.4
2,954,385 9/1967 Burney et al. _____ 260—346.4

FOREIGN PATENTS 1,166,763 4/1964 West Germany.

HENRY R. JILES, Primary Examiner
B. DENTZ, Assistant Examiner

U.S. Cl. X.R.

252—440